(12) United States Patent
Husemann et al.

(10) Patent No.: US 7,935,215 B2
(45) Date of Patent: May 3, 2011

(54) HEAT-ACTIVATEDLY BONDABLE 2D ELEMENT

(75) Inventors: Marc Husemann, Hamburg (DE); Matthias Koop, Norderstedt (DE); Frank Hannemann, Hamburg (DE)

(73) Assignee: tesa SE, Hamburg (DE)

( * ) Notice: Subject to any disclaimer, the term of this patent is extended or adjusted under 35 U.S.C. 154(b) by 679 days.

(21) Appl. No.: 11/619,835

(22) Filed: Jan. 4, 2007

(65) Prior Publication Data

US 2008/0115888 A1 May 22, 2008

(30) Foreign Application Priority Data

Nov. 21, 2006 (DE) .......................... 10 2006 055 093

(51) Int. Cl.
*C09J 5/02* (2006.01)
*C04B 37/00* (2006.01)
*B32B 7/12* (2006.01)
*B32B 15/04* (2006.01)

(52) U.S. Cl. ....................... 156/325; 156/307.5; 428/346

(58) Field of Classification Search ............... 156/307.5, 156/325; 428/346
See application file for complete search history.

(56) References Cited

U.S. PATENT DOCUMENTS

| | | | | |
|---|---|---|---|---|
| 4,620,727 A | * | 11/1986 | Stockburger et al. | 283/82 |
| 5,298,872 A | * | 3/1994 | Trump et al. | 333/202 |
| 5,858,579 A | * | 1/1999 | Ito et al. | 430/5 |
| 6,054,509 A | | 4/2000 | Arai et al. | |
| 2005/0282002 A1 | * | 12/2005 | Husemann et al. | 428/328 |
| 2006/0188709 A1 | * | 8/2006 | Jannic | 428/343 |
| 2007/0138296 A1 | * | 6/2007 | Bargmann et al. | 235/492 |

FOREIGN PATENT DOCUMENTS

| EP | 0 284 564 B1 | | 5/1992 |
|---|---|---|---|
| WO | WO 2005/021671 | * | 3/2005 |

* cited by examiner

*Primary Examiner* — Philip C Tucker
*Assistant Examiner* — Michael N Orlando
(74) *Attorney, Agent, or Firm* — Norris McLaughlin & Marcus PA

(57) ABSTRACT

Presented is a heat-activatedly bondable 2D element having a first adhesive and a second adhesive, which is suitable for bonding objects with a metal surface to objects with a plastic surface, and which enables a stable and mechanically robust bond even at low temperatures. This is achieved through the use of particular combinations of different adhesives, tailored to one another and based on synthetic nitrile rubbers and reactive resins.

18 Claims, 3 Drawing Sheets

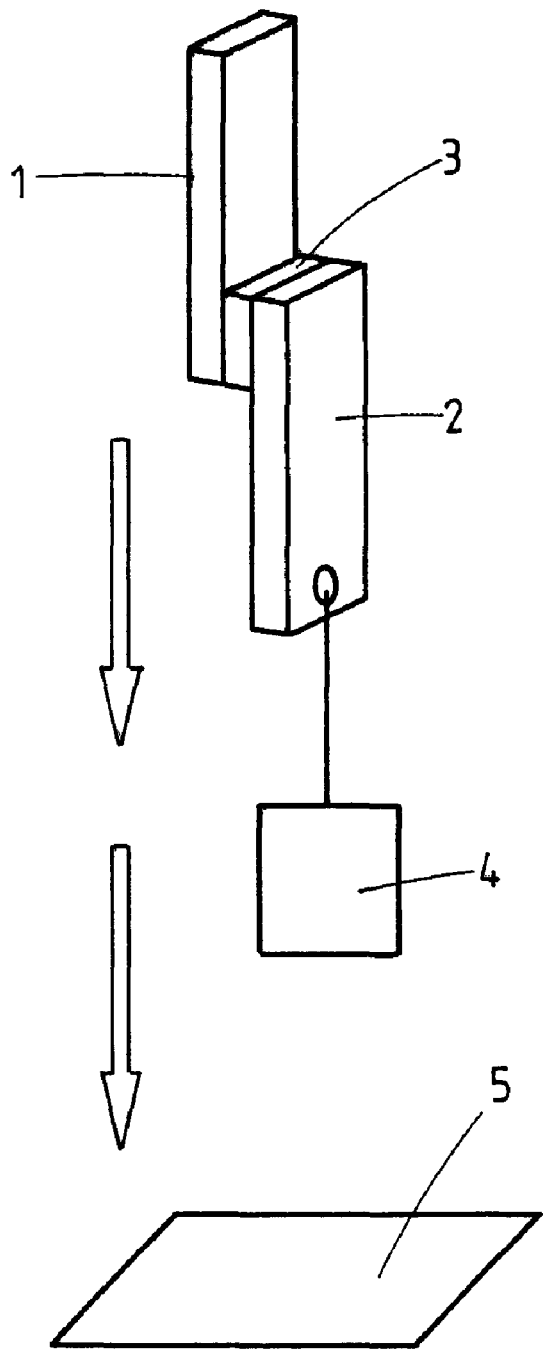
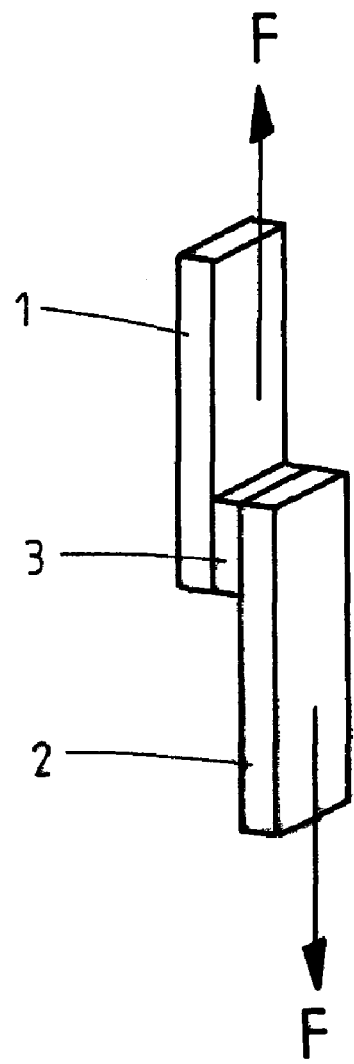
FIG.1
FIG.2

HEAT-ACTIVATEDLY BONDABLE 2D ELEMENT

The invention relates to a heat-activatedly adhesively bondable substantially two-dimensional (2D) element having a first adhesive and a second adhesive, and to the use of this 2D element for bonding an object with a metal surface to an object with a plastic surface. The invention further relates to the adhesive bonding of decorative elements to electronic devices, to a decorative element having such a 2D element, and to an electronic device having such a 2D element.

BACKGROUND OF THE INVENTION

Objects with metal surfaces are frequently joined to objects with plastic surfaces using double-sidedly adhesive 2D elements such as, for instance, adhesive labels, adhesive tapes, adhesive sheets or the like. In order to be able to join different materials firmly to one another it is necessary for the two faces of the 2D element each to have different adhesives, tailored to the respective substrate. Thus an adhesive which ensures a stable adhesive bond on a metal surface is generally of limited suitability at best for bonding to plastics, and vice versa.

Where the faces to be joined are relatively large, extensive 2D elements can be employed which are furnished on both sides with pressure-sensitive adhesives. Because of the large bonding area, the resultant fixing and fastening of the metal components to the plastic elements are sufficiently stable.

Where, however, smaller parts are to be joined to one another, in the field for example of electronics for entertainment and communication, the bond strength which is achievable with pressure-sensitive adhesive systems is often not enough to ensure a stable join. In the case of systems of this kind, therefore, heat-activatedly bonding adhesives are employed, which are bonded while hot and, after cooling, provide a mechanically robust join.

Heat-activatedly bonding adhesives can be classified in principle in two categories: thermoplastic heat-activatedly bonding adhesives, and reactive heat-activatedly bonding adhesives.

Thermoplastic adhesives are based on polymers which on heating undergo reversible softening and solidify again in the course of cooling. A disadvantage of this is that when pressure is applied to thermoplastic adhesives of this kind they may exhibit an adverse flow behaviour (known as "oozing"). The change in shape of the adhesive under pressure makes it disadvantageous to use thermoplastic heat-activatedly bonding adhesives to bond fine structures, since in such situations it is possible for the adhesive to exit from the thin bondline.

Reactive heat-activatedly bonding adhesives, in contrast, comprise elastic components and reactive components. The latter are the resins known as reactive resins, in which heating initiates a process of crosslinking which after the end of the crosslinking reaction ensures a durable, stable bond even under pressure. Of particular interest as elastic components are synthetic nitrile rubbers, which on account of their high flow viscosity give the heat-activatedly bonding adhesive a dimensional stability which is particularly high even under pressure.

This kind of low flow capacity with high dimensional stability, however, may also have disadvantages associated with it, since at low temperatures the heat-activatedly bonding adhesive very rapidly solidifies and becomes brittle. The consequence of this is that, at low temperatures, the adhesive bond is mechanically sensitive towards external influence and may therefore part even on low-intensity impacts. Such sensitivity to impact (shock sensitivity) at low temperatures is particularly undesirable for the adhesive bonding of components in portable equipment, since such equipment is used outdoors as well, where it may be exposed both to high and to low temperatures.

Impact sensitivity is particularly problematic for joins between metal substrates and plastic surfaces, since in the event of impact the plastic is able to absorb some of the energy but the metal frequently does not deform, and so the greatest part of the impact energy must be accommodated by the heat-activatedly bondable 2D element.

A further factor is that the stability of a heat-activatedly bondable 2D element with two different adhesives—one adhesive for bonding to a metallic substrate and another for bonding to a plastic surface—is in any case highly dependent on the prevailing ambient temperature. This is attributable to the difference in the anchoring of the two adhesives to one another or to a common carrier, and is attributable in particular to the temperature dependencies of the thermal expansion behaviour, of the viscosities or of the structure on the temperature, which are different for the two adhesives. Since, therefore, at low temperatures in particular, the anchoring faces of these 2D elements have only a low mechanical load-bearing capacity, these anchoring faces are particularly susceptible to impacts, and so the 2D element splits particularly easily at these points.

It is an object of the present invention, therefore, to provide a heat-activatedly bondable 2D element having a first adhesive and a second adhesive that eliminates these disadvantages and that makes it possible in particular over a broad temperature range to achieve impact-insensitive and stable adhesive bonding of metal substrates to plastic substrates, and also a high dimensional stability. The intention in particular is to provide a heat-activatedly bondable 2D element which is insensitive to impact at −20° C. and offers a high strength of bonding to plastic surfaces and metal surfaces in a temperature range from −20° C. to +50° C.

SUMMARY OF THE INVENTION

This object is achieved in accordance with the invention by means of a heat-activatedly bondable 2D element, having a first adhesive and a second adhesive, wherein the first adhesive comprises at least one synthetic nitrile rubber, namely the first nitrile rubber, and at least one reactive resin which is capable of crosslinking with itself, with other reactive resins and/or with the at least one synthetic nitrile rubber of the first adhesive, the first nitrile rubber having an acrylonitrile fraction of more than 20% by weight and less than 50% by weight, based on the total mass of the nitrile rubbers in the first adhesive. The second adhesive comprises a blend of at least three synthetic nitrile rubbers, namely the second nitrile rubber, the third nitrile rubber and the fourth nitrile rubber, and at least one reactive resin which is capable of crosslinking with itself, with other reactive resins and/or with at least one of the synthetic nitrile rubbers of the second adhesive. Here it is necessary for the blend to be microphase-separated, characterized by at least three different glass transition temperatures in a differential scanning calorimetry thermogram, the blend having at least three glass transition temperatures, including an upper glass transition temperature of more than +10° C., a middle glass transition temperature and a lower glass transition temperature of less than −20° C. Finally it is necessary for the second nitrile rubber to have an acrylonitrile fraction of 35% by weight or more, based on the total mass of the nitrile rubbers in the second adhesive, for the third nitrile rubber to have an acrylonitrile fraction of more than 25% by weight and less than 35% by weight, based on the total mass of the nitrile rubbers in the second adhesive, and for the fourth nitrile rubber to have an acrylonitrile fraction of 25% by weight or less, based on the total mass of the nitrile rubbers in the second adhesive.

DETAILED DESCRIPTION

This design ensures that the 2D element attaches outstandingly both to metallic substrates and to substrates made from plastics, and at the same time allows the resultant bond to be highly robust within a broad temperature range. In particular the first adhesive is suitable for bonding the face element to metal surfaces and the second adhesive for bonding the face element to plastic surfaces. Both adhesives have a high bond strength to the respective substrates, and good dimensional stability, under pressure and also over a large temperature range, in other words not only at low temperatures but also at high temperatures.

It is also particularly advantageous if the second nitrile rubber of the second adhesive has a glass transition temperature, as determined in a differential scanning calorimetry thermogram, of $-20°$ C. or higher, preferably of $-15°$ C. or higher.

As a result of the special matching of both adhesives to one another, in terms of the construction, a heat-activatedly bondable 2D element that is double-sidedly coated with these two adhesives has a bond strength which remains approximately the same over a large temperature range and under pressure. This high bond strength obtains not merely on the bonding area with the respective substrates but also on the anchoring face on the 2D element that is present between the two adhesives, since both adhesives are tailored to one another in terms of their temperature behaviour as well. Consequently this construction affords bonding of the 2D element that is stable overall under different application conditions, without detachment of one of the adhesives from the substrate or from the 2D element.

In one advantageous design form at least part of the surface of the first adhesive is in contact with part of the surface of the second adhesive. This produces a stable join between the two adhesives tailored to one another, and effectively prevents detachment of both adhesives from the 2D element. This is achieved in particular when the 2D element is of carrier-free design. This ensures a maximum area of contact between the two adhesives and hence a particularly high degree of anchoring to one another.

It is also favourable, however, if the 2D element comprises a porous backing. The use of a carrier brings about a particularly high level of impact insensitivity in the bond obtained using the 2D element, since the inherent stability of the carrier gives it the capacity for efficient absorption of impact energy. Since, in addition, the carrier is of porous design, both adhesives are in contact with one another, resulting in particularly stable anchoring of the adhesives to one another and to the 2D element.

It is advantageous, moreover, if the average thickness of a first adhesive coating comprising the first adhesive and/or the average thickness of a second adhesive coating comprising the second adhesive lies in a range from 5 µm to 500 µm, and particularly if it lies in a range from 15 µm to 300 µm. This ensures a particularly intense join of the adhesives to the substrate, with the adhesives able to compensate any unevennesses in the substrate surfaces. In addition it improves the elasticity of the 2D element for the absorption of impact energy.

The 2D element is particularly suitable if the second nitrile rubber in the second adhesive has an acrylonitrile fraction of less than 60% by weight, based on the total mass of the nitrile rubbers in the second adhesive. Through this choice of material it is possible to avoid complete phase separation within the second adhesive.

It is further of advantage if in the second adhesive the mass fraction of the second nitrile rubber is between 5% and 50% by weight, based on the total mass of the nitrile rubbers in the second adhesive; the mass fraction of the third nitrile rubber is between 10% and 90% by weight, based on the total mass of the nitrile rubbers in the second adhesive; and the mass fraction of the fourth nitrile rubber is between 5% and 50% by weight, based on the total mass of the nitrile rubbers in the second adhesive. This makes possible an optimum dimensional stability of the second adhesive at the same time as a high bond strength of the adhesive to plastic surfaces.

The 2D element is also particularly suitable if the blend of the second adhesive has a middle glass transition temperature which represents a broadly distributed glass transition temperature range. By this means a gradual transition in the technical adhesive properties is achieved, without having to reckon with abrupt or other discontinuities.

It is also favourable if use is made as reactive resins of epoxy resins, novolak resins, melamine resins, phenolic resins, terpene phenolic resins and/or polyisocyanate-based resins. By virtue of such resins, crosslinking can be particularly stable, and hence the stability of the adhesive bond can be particularly high.

It is additionally advantageous if the reactive resins are present in the first adhesive and/or in the second adhesive in a mass fraction of at least 25% and not more than 75% by weight, based in each case on the total mass of the mixture of the nitrile rubbers and the reactive resins in the respective adhesive. By this means, adhesives with a particularly high dimensional stability are made available.

Finally it is favourable if the first adhesive and/or the second adhesive comprise bond strength enhancer resins, in particular at a mass fraction of not more than 25% by weight, based on the total mass of the respective adhesive. In particular here the use of reactive resins in a fraction of at least 30% and not more than 75% by weight is advantageous, based on the total mass of nitrile rubbers and reactive resin in the respective adhesive. By this means it is possible to raise the bond strength of the adhesives on the respective substrate in accordance with the requirements, and to ensure a highly stable adhesive bond.

Provided in a further aspect of the present invention is the use of a 2D element according to any one of the preceding claims for bonding an object having a metal surface to an object having a plastic surface, the first adhesive being bonded to the metal surface and the second adhesive to the plastic surface. The use of the bondable 2D elements which have hitherto been customary affords sufficient bond strength in the art only in a narrow temperature range, but with only a low bond strength at different temperatures. Using the 2D element described above gives a join which is stable and mechanically robust under different ambient conditions.

Also proposed is the use of the 2D element for bonding decorative elements to electronic devices. By this means it is possible to maintain the electronic devices in unheated areas, such as outdoors, and in heated spaces, without any adverse effect on their appearance as a result of detachment of the decorative elements under load, thereby making it possible to produce, in particular, mobile electronic devices.

In this context the invention likewise provides a decorative element which is already made up with at least one of the above 2D elements for adhesive bonding, and an electronic device which is made up with at least one of the above 2D elements for adhesive bonding. By this means it becomes particularly simple to bond decorative elements to electronic devices and in so doing to obtain a join which is robust within a broad temperature range.

2D elements are considered to embrace all customary sheet-like structures which allow adhesive bonding. These structures may be of various configurations, particularly flexible, in the form for example of a tape, label or sheet. Heat-activatedly bondable 2D elements are 2D elements which are adhesively bonded while hot and after cooling afford a mechanically robust join to the bond substrate. For this purpose the heat-activatedly bondable 2D elements are furnished on one or both sides with heat-activatedly bonding adhesives.

In the present case the heat-activatedly bondable 2D elements have two heat-activatedly bonding adhesives; a first adhesive and a second adhesive. Of these two adhesives, the composition of the first adhesive is chosen such that the adhesive exhibits high bond strength to metallic surfaces; this first adhesive is disposed on the first surface of the 2D element. The second adhesive, in contrast, has a composition chosen such that the adhesive exhibits high bond strength to plastic surfaces; this second adhesive is usually disposed on the second surface of the 2D element.

The first adhesive comprises at least one synthetic nitrile rubber—the first nitrile rubber—and at least one reactive resin. As well as these two components the first adhesive may of course also comprise further ingredients, including further rubbers or even further nitrile rubbers.

As synthetic nitrile rubber it is possible to use all typical, suitable, synthetic rubbers that are nitrile-based, examples being nitrile-butadiene rubbers comprising acrylonitrile and butadiene and/or nitrile-chloroprene rubbers comprising acrylonitrile and chloroprene.

These may be in unmodified form or else in modified form, for instance as epoxidized nitrile rubbers or as hydrogenated nitrile rubbers.

Among these, nitrile-butadiene rubbers in particular are suitable.

Nitrile-butadiene rubbers are available under the names Europrene™ from Eni Chem, Krynac™ or Perbunan™ from Bayer, and Breon™ or Nipol N™ from Zeon. Hydrogenated nitrile-butadiene rubbers are available as Therban™ from Bayer and Zetpol™ from Zeon. Nitrile-butadiene rubbers of this kind are polymerized either hot or cold.

The first nitrile rubber has an acrylonitrile fraction of more than 20% and less than 50% by weight, based on the total mass of the nitrile rubbers in the first adhesive. This embraces both acrylonitrile and its derivatives.

In one favourable development the first nitrile rubber of the first adhesive has a glass transition temperature as determined in a differential scanning calorimetry thermogram of −20° C. or higher, preferably of more than −15° C. The glass transition temperatures quoted here all correspond to those which are obtained from quasi-steady-state experiments. The quasi-steady-state method used was in particular that of differential scanning calorimetry (DSC, in accordance with DIN 53765, heating and cooling rate 20 K/min), whose thermograms were used to determine the glass transition temperatures.

A further criterion for the selection of the respective first nitrile rubber is its Mooney viscosity, a standardized flow viscosity for rubber compounds that is determined using a Mooney viscometer. Since the intention is to ensure high flexibility at low temperatures, the Mooney viscosity ought to amount to less than ML(1+4/100° C.)=120 MU ("Mooney Units"). A commercial example of such nitrile rubbers is, for instance, Nipol™ 40-5 from Zeon Chemicals.

The first adhesive further comprises a reactive resin which is capable of crosslinking with itself, with other reactive resins and/or with the at least one synthetic nitrile rubber of the first adhesive. Reactive resins in an adhesive influence the technical adhesive properties of that adhesive as a consequence of chemical reactions. As reactive resins it is possible in the present case to use all typical reactive resins. Reactive resins which can be used include, in particular, epoxy resins, novolak resins, melamine resins, phenolic resins, terpene phenolic resins and/or polyisocyanate-based resins.

In a favourable development of the invention the reactive resins are present in the first adhesive at a mass fraction of at least 25% and not more than 75% by weight, based in each case on the total mass of the mixture of the nitrile rubbers and the reactive resins in the respective adhesive.

Epoxy resins which can be used are all suitable epoxy resins known to the skilled person, especially polymeric epoxy resins having an average molecular weight $M_w$ from a range from 100 g/mol to a maximum of 10 000 g/mol; for instance, glycidyl esters, epichlorohydrin, the reaction product of epichlorohydrin and bisphenol A, and the reaction product of epichlorohydrin and p-aminophenol. Preferred commercial examples thereof are Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071, HPT™ 1079, likewise from Shell Chemical. Examples of commercial aliphatic epoxy resins are vinylcyclohexane dioxides such as ERL-4206, ERL-4221, ERL-4201, ERL-4289 and ERL-0400 from Union Carbide Corp.

Novolak resins which can be used include all suitable novolak resins known to the skilled worker, examples being Epi-Rez™ 5132 from Celanese, ESCN-001™ from Sumitomo Chemical, CY-281 ™ from Ciba Geigy, DEN™ 431, DEN™ 438, Quatrex™ 5010 from Dow Chemical, RE 305S from Nippon Kayaku, Epiclon™ N673 from DaiNippon Ink Chemistry and Epicote™ 152 from Shell Chemical.

Melamine resins which can be used include all suitable melamine resins known to the skilled person, examples being Cymel™ 327 and 323 from Cytec.

Phenolic resins which can be used include all suitable phenolic resins known to the skilled person, examples being YP 50 from Toto Kasei, PKHC™ from Union Carbide Corp., and BKR™ 2620 from Showa Union Gosei Corp. As reactive resins it is also possible to use phenolic resole resins, alone or in combination with other phenolic resins.

Terpene phenolic resins which can be used include all suitable terpene phenolic resins known to the skilled person, an example being NIREZ™ 2019 from Arizona Chemical.

As polyisocyanate-based resins it is possible to use all polyisocyanate-based resins that are suitable and known to the skilled worker, examples being Coronate™ L from Nippon Polyurethan Ind., Desmodur™ N3300 and Mondur™ 489 from Bayer.

In order to accelerate the reaction between the two components it is also possible optionally for the first adhesive to comprise crosslinkers and accelerants. Suitable accelerants include all of the suitable accelerants that are known to the skilled person, for instance imidazoles, available commercially as 2M7, 2E4MN, 2PZ-CN, 2PZ-CNS, P0505 and L07N from Shikoku Chem. Corp. and as Curezol 2MZ from Air Products, and also amines, especially tertiary amines. Suitable crosslinkers include all of the suitable crosslinkers that are known to the skilled person, an example being hexamethylenetetramine (HMTA).

The second adhesive comprises a blend of at least three synthetic nitrile rubbers—the second nitrile rubber, the third nitrile rubber, and the fourth nitrile rubber—and also at least one reactive resin. A blend for the present purposes is any mixture or combination of different components. As well as these components, the second adhesive can of course also comprise further ingredients. In addition to the three nitrile rubbers, furthermore, the blend may also comprise other rubbers or even nitrile rubbers.

In accordance with the invention the blend is microphase-separated. Microphase separation is the term used for the at least partial appearance of phases with different structure within the adhesive, which may come about following chemical coupling of thermodynamically incompatible polymer chain regions within the adhesive for certain compositions of the adhesive (formation of "domains"). Thermodynamically compatible regions undergo association, while thermodynamically incompatible regions segregate into spatially separate domains, without any macroscopic phase separation. For the invention it is not necessary for the microphase separation that occurs to produce "ideal" structures or "incomplete" structures. Typical methods of ascertaining the presence of microphase separation include, for example, transmission electron microscopy (TEM), atomic force microscopy (AFM), scattering methods (for instance neutron scattering or small-angle X-ray scattering) or measurement of NMR spin diffusion.

In the case of phases with different softening points, microphase separation can also be detected by employing rheological methods or calorimetric techniques such as differential thermoanalysis (DTA) or differential scanning calorimetry (DSC). As a criterion for microphase separation within the blend it has been deemed sufficient in the present case for an analysis of the blend by means of differential scanning calorimetry to lead to the observation in each case of at least three different glass transition temperatures—to be more precise, in the data plots that are obtained in the course of such analysis, the thermograms.

The blend of the second adhesive has at least three glass transition temperatures, of which the upper glass transition temperature is more than +10° C. and the lower glass transition temperature is less than −20° C. In the present case of a microphase separation, the phase with the lowest glass transition temperature determines the low-temperature impact strength and the adhesion at low temperatures, while at high temperatures the bond strength and the dimensional stability of the die cuts under pressure and under temperature exposure is determined by the highest glass transition temperature.

The middle glass transition temperature is preferably a glass transition temperature at which a glass transition (i.e. the softening) takes place gradually not in a narrow temperature range but instead in a broad temperature range. In this case, therefore, the middle glass transition temperature is also a broadly distributed glass transition temperature range.

The phase with the highest glass transition temperature may comprise alternatively the second nitrile rubber, the third nitrile rubber or the fourth nitrile rubber. Accordingly, the phase with the lowest glass transition temperature is assigned to another of these nitrile rubbers, and the phase with the middle glass transition temperature is assigned to the last of the three nitrile rubbers.

As synthetic nitrile rubber it is possible to use all typical, suitable, synthetic rubbers that are nitrile-based, examples being nitrile-butadiene rubbers comprising acrylonitrile and butadiene and/or nitrile-chloroprene rubbers comprising acrylonitrile and chloroprene. These may be in unmodified form or else in modified form, for instance as epoxidized nitrile rubbers or as hydrogenated nitrile rubbers.

Among these, nitrile-butadiene rubbers in particular are suitable.

Nitrile-butadiene rubbers are available under the names Europrene™ from Eni Chem, Krynac™ or Perbunan™ from Bayer, and Breon™ or Nipol N™ from Zeon. Hydrogenated nitrile-butadiene rubbers are available as Therban™ from Bayer and Zetpol™ from Zeon. Nitrile-butadiene rubbers of this kind are polymerized either hot or cold.

The second nitrile rubber has an acrylonitrile fraction of 35% by weight or more, based on the total mass of the nitrile rubbers in the second adhesive. This embraces both acrylonitrile and its derivatives. The second nitrile rubber, furthermore, may have an acrylonitrile fraction of less than 60% by weight, based on the total mass of the at least three nitrile rubbers in the second adhesive, in order to avoid complete phase separation.

The mass fraction of the second nitrile rubber is chosen within a typical range, known to the skilled person, and is adapted to the respective composition and also, correspondingly, the intended use. An advantageous mass fraction is one between 5% and 50% by weight, based on the total mass of the nitrile rubbers in the second adhesive.

In one favourable development the second nitrile rubber of the second adhesive has a glass transition temperature of −20° C. or more, preferably of more than −15° C., in order to achieve microphase separation.

A further criterion for the selection of the respective second nitrile rubber is its Mooney viscosity. Since the intention is to ensure a high flexibility at low temperatures, the Mooney viscosity ought to amount to less than ML(1+4/100° C.)=120 MU. A commercial example of nitrile rubbers of this kind is, for instance, Nipol™ 40-5 from Zeon Chemicals.

The third nitrile rubber has an acrylonitrile fraction of more than 25% and less than 35% by weight, based on the total mass of the nitrile rubbers in the second adhesive. This embraces both acrylonitrile and its derivatives. The third nitrile rubber, furthermore, may have an acrylonitrile fraction of less than 60% by weight, based on the total mass of the at least three nitrile rubbers in the second adhesive, in order to avoid complete phase separation.

The mass fraction of the third nitrile rubber is chosen within a typical range, known to the skilled person, and is adapted to the respective composition and also, correspondingly, the intended use. An advantageous mass fraction is one between 10% and 90% by weight, based on the total mass of the nitrile rubbers in the second adhesive.

In one favourable development the third nitrile rubber of the second adhesive has a glass transition temperature of less than −20° C., preferably of less than −25° C., in order to achieve microphase separation.

A further criterion for the selection of the respective third nitrile rubber is its Mooney viscosity. Since the intention is to ensure a high flexibility at low temperatures, the Mooney viscosity ought to amount to less than ML(1+4/100° C.)=120 MU. A commercial example of nitrile rubbers of this kind is, for instance, Breon™ N33C50 from Zeon Chemicals.

The fourth nitrile rubber has an acrylonitrile fraction of less than 25% by weight, based on the total mass of the nitrile rubbers in the second adhesive. This embraces both acrylonitrile and its derivatives. The fourth nitrile rubber, furthermore, may have an acrylonitrile fraction of more than 4% by weight, based on the total mass of the at least three nitrile rubbers in the second adhesive, in order to avoid complete phase separation.

The mass fraction of the fourth nitrile rubber is chosen within a typical range, known to the skilled person, and is adapted to the respective composition and also, correspondingly, the intended use. An advantageous mass fraction is one between 5% and 50% by weight, based on the total mass of the nitrile rubbers in the second adhesive.

In one favourable development the fourth nitrile rubber of the second adhesive has a glass transition temperature of less than −35° C., preferably of less than −40° C., in order to achieve microphase separation.

A further criterion for the selection of the respective fourth nitrile rubber is its Mooney viscosity. Since the intention is to ensure a high flexibility at low temperatures, the Mooney viscosity ought to amount to less than ML(1+4/100° C.)=120 MU. A commercial example of nitrile rubbers of this kind is, for instance, Nipol™ 1034-60 from Zeon Chemicals.

The second adhesive further comprises at least one reactive resin which is capable of crosslinking with itself, with other reactive resins and/or with at least one of the synthetic nitrile rubbers of the second adhesive. As reactive resins it is possible in the present case to use all typical reactive resins. Reactive resins which can be used include, in particular, epoxy resins, novolak resins, melamine resins, phenolic resins, terpene phenolic resins and/or polyisocyanate-based resins.

In a favourable development of the invention the reactive resins are present in the second adhesive at a mass fraction of at least 25% and not more than 75% by weight, based in each case on the total mass of the mixture of the nitrile rubbers and the reactive resins in the second adhesive.

Epoxy resins which can be used are all suitable epoxy resins known to the skilled person, especially polymeric epoxy resins having a molecular weight $M_w$ from a range from 100 g/mol to a maximum of 10 000 g/mol; for instance, glycidyl esters, epichlorohydrin, the reaction product of epichlorohydrin and bisphenol A, and the reaction product of epichlorohydrin and p-aminophenol. Preferred commercial examples thereof are Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071, HPT™ 1079, likewise from Shell Chemical. Examples of commercial aliphatic epoxy resins are vinylcyclohexane dioxides such as ERL-4206, ERL-4221, ERL-4201, ERL-4289 and ERL-0400 from Union Carbide Corp.

Novolak resins which can be used include all suitable novolak resins known to the skilled worker, examples being Epi-Rez™ 5132 from Celanese, ESCN-001™ from Sumitomo Chemical, CY-281™ from Ciba Geigy, DEN™ 431, DEN™ 438, Quatrex™ 5010 from Dow Chemical, RE 305S from Nippon Kayaku, Epiclon™ N673 from DaiNippon Ink Chemistry and Epikote™ 152 from Shell Chemical.

Melamine resins which can be used include all suitable melamine resins known to the skilled person, examples being Cymel™ 327 and 323 from Cytec.

Phenolic resins which can be used include all suitable phenolic resins known to the skilled person, examples being YP 50 from Toto Kasei, PKHC™ from Union Carbide Corp., and BKR™ 2620 from Showa Union Gosei Corp. As reactive resins it is also possible to use phenolic resole resins, alone or in combination with other phenolic resins.

Terpene phenolic resins which can be used include all suitable terpene phenolic resins known to the skilled person, an example being NIREZ™ 2019 from Arizona Chemical.

As polyisocyanate-based resins it is possible to use all polyisocyanate-based resins that are suitable and known to the skilled worker, examples being Coronate™ L from Nippon Polyurethan Ind., Desmodur™ N3300 and Mondur™ 489 from Bayer.

In order to accelerate the reaction between the two components it is also possible optionally for the second adhesive to comprise crosslinkers and accelerants. Suitable accelerants include all of the suitable accelerants that are known to the skilled person, for instance imidazoles, available commercially as 2M7, 2E4MN, 2PZ-CN, 2PZ-CNS, P0505 and L07N from Shikoku Chem. Corp. and as Curezol 2MZ from Air Products, and also amines, especially tertiary amines. Suitable crosslinkers include all of the suitable crosslinkers that are known to the skilled person, an example being hexamethylenetetramine (HMTA).

Additionally to the nitrile rubbers and the reactive resins, the first adhesive and/or the second adhesive may optionally also comprise further ingredients, examples being plasticizers, fillers, nucleators, expandants, bond strength enhancer additives and thermoplastic additives, compounding agents and/or ageing inhibitors.

As plasticizers it is possible to use all suitable plasticizers known to the skilled worker, examples being those based on polyglycol ethers, polyethylene oxides, phosphate esters, aliphatic carboxylic esters and benzoic esters, aromatic carboxylic esters, relatively high molecular mass diols, sulphonamides and adipic esters.

Fillers which can be used are all suitable fillers known to the skilled person, examples being fibres, carbon black, zinc oxide, titanium dioxide, chalk, silica, silicates, solid beads, hollow beads or microbeads made of glass or other materials.

Ageing inhibitors which can be used are all suitable ageing inhibitors known to the skilled person, examples being those based on primary and secondary antioxidants or light stabilizers.

Bond strength enhancer additives that can be used are all suitable bond strength enhancer additives known to the skilled person, examples being polyvinylformal, polyvinylbutyral, polyacrylate rubber, chloroprene rubber, ethylene-propylene-diene rubber, methyl-vinyl-silicone rubber, fluorosilicone rubber, tetrafluoroethylene-propylene copolymer rubber, butyl rubber or styrene-butadiene rubber. Polyvinylformals are available as Formvar™ from Ladd Research. Polyvinylbutyrals are available as Butvar™ from Solucia, as Pioloform™ from Wacker and as Mowital™ from Kuraray. Polyacrylate rubbers are available as Nipol AR™ from Zeon. Chloroprene rubbers are available as Baypren™ from Bayer. Ethylene-propylene-diene rubbers are available as Keltan™ from DSM, as Vistalon™ from Exxon Mobil and as Buna EP™ from Bayer. Methyl-vinyl-silicone rubbers are available as Silastic™ from Dow Corning and as Silopren™ from GE Silicones. Fluorosilicone rubbers are available as Silastic™ from GE Silicones. Butyl rubbers are available as Esso Butyl™ from Exxon Mobil. Styrene-butadiene rubbers are available as Buna S™ from Bayer, as Europrene™ from Eni Chem and as Polysar S™ from Bayer.

Thermoplastic additives which can be used include all suitable thermoplastics known to the skilled person, examples being thermoplastic materials from the group of polyurethanes, polystyrene, acrylon itrile-butadiene-styrene terpolymers, polyesters, unplasticized polyvinyl chlorides, plasticized polyvinyl chlorides, polyoxymethylenes, polybutylene terephthalates, polycarbonates, fluorinated polymers such as polytetrafluoroethylene, polyamides, ethylene-vinyl acetates, polyvinyl acetates, polyimides, polyethers, copolyamides, copolyesters, polyacrylates and polymethacrylates, and polyolefins such as polyethylene, polypropylene, polybutene and polyisobutene, for instance.

A further possibility, as an option, is to add bond strength enhancer resins to the first adhesive and/or to the second adhesive in order to optimize the technical adhesive properties and the activation range of the adhesive. As bond strength enhancer resins it is possible without exception to use all existing tackifying resins and those described in the literature, examples being pinene resins, indene resins, and rosins, their disproportionated, hydrogenated, polymerized and/or esterified derivatives and salts, aliphatic and aromatic hydrocarbon resins, terpene resins and terpene phenolic resins, and also C5-hydrocarbon resins, C9-hydrocarbon resins and other hydrocarbon resins. Any desired combinations of these and further resins may be used in order to adjust the properties of the resultant adhesive in accordance with requirements. Generally speaking it is possible to use all resins that are compatible with the nitrile rubbers, more particularly all aliphatic, aromatic or alkylaromatic hydrocarbon resins, hydrocarbon resins based on single monomers, hydrogenated hydrocarbon resins, functional hydrocarbon resins and natural resins; in this context reference may be made expressly to the depiction of the state of the art in the "Handbook of Pressure Sensitive Adhesive Technology" by Donatas Satas (van Nostrand, 1989). The bond strength enhancer resins may be added to the first adhesive and/or to the second adhesive in any suitable amount, a mass fraction of at most 25% by weight being typical, based on the total mass of the respective adhesive.

Above and beyond this, the bond strength of the heat-activatedly bondable 2D element can be increased by further judicious additization, such as through use of polyimine copolymers and/or polyvinyl acetate copolymers as bond strength promoters.

The first adhesive is applied to the 2D element as a first adhesive coating, and the second adhesive as a second adhesive coating. The 2D element may be of carrier-free design, in the form for instance of an adhesive transfer tape, or else may have a carrier, in order to give the 2D element greater mechanical stability. Such a carrier may be composed of any of the materials that are familiar to the skilled person, as for example from polymers such as polyesters, polyethylene, polypropylene, including modified polypropylene such as biaxially oriented polypropylene (BOPP) for instance, polyamide, polyimide, polyvinyl chloride or polyethylene terephthalate, or from natural substances; these carriers may take the form of wovens, knits, scrims, nonwovens, papers, foams, sheets and the like, or else of combinations thereof, such as laminates or woven films.

In order to obtain particularly effective anchoring of the adhesives to the 2D element it is sensible for the two adhesives to be in contact with one another, by virtue of part of the surface of the first adhesive being in contact with part of the surface of the second adhesive. In the case of a carrier-free configuration this is so in any case. If a carrier is used, however, it ought to be of porous design in order to improve the anchoring. A pore is interpreted as any opening of any size in the surface of the carrier that allows partial penetration of the carrier by adhesives, in particular a through aperture, which thus continuously connects one side of the carrier to the other side of the carrier, so that both adhesives can be in contact with one another via these pores. The viscosity of the adhesives, which is usually already high on application, requires the dimensions of these pores to be sufficiently large to allow the adhesives to enter into the pores. The pores may be present in the carrier as an inherent part of its production—as in the case of wovens, knits, scrims, nonwovens, paper or foams, for instance—or else may be made in the carriers separately after the carrier in question has been produced, as by means of hot needling or laser perforation of carrier sheets, for instance.

To further improve the adhesion, moreover, the carrier can be provided on one or both sides with an adhesion promoter, known as a "primer". As adhesion promoters of this kind it is possible to use typical primer systems, such as heat-sealing adhesives based on polymers such as ethyl-vinyl acetate or functionalized ethyl-vinyl acetates, or else reactive polymers. Functional groups which can be used are all typical adhesion-enhancing groups, such as epoxide, aziridine, isocyanate or maleic anhydride groups. It is also possible for additional crosslinking components to have been added to the adhesion promoters, moreover, examples being melamine resins or melamine-formaldehyde resins. Highly suitable adhesion promoters thus include those based on polyvinylidene chloride and copolymers of vinylidene dichloride, in particular with vinyl chloride (for instance, Saran from the Dow Chemical Company).

Mixtures of the nitrile rubber components can be produced in typical methods in the form of solid, in solution or in the melt. For production in solution it is preferred to use solvents in which at least one of the components of the respective adhesive has a good solubility.

For blending the nitrile rubbers with the other ingredients such as reactive resins or further additives it is possible to use all known mixing or stirring technologies. Thus, for example, for producing a homogeneous mixture, static or dynamic mixing assemblies are employed. Depending on composition, the introduction of heat may be sensible for this purpose, in which case it should be ensured that the mixing temperature is significantly lower than the activation temperature for reactive processes, such as for reaction of the reactive resins, for instance.

Alternatively the nitrile rubber components can be blended in the melt. For this purpose it is possible for compounders, twin-screw extruders or planetary roller extruders to be employed. The blending of the nitrile rubbers with the other ingredients may likewise be carried out in the melt. Such blending takes place preferably under hot conditions, and here again the mixing temperature should be significantly lower than the activation temperature for reactive processes in the mixing assembly.

The first adhesive and/or the second adhesive are applied to the 2D element by conventional methods. For instance, the respective adhesive can be applied from a solution. For dissolving, use is made here again preferably of those solvents in which at least one of the components of the respective adhesive has a good solubility.

For application of the respective adhesive from the melt it is possible for any solvent present to be stripped off, in a concentrating extruder under reduced pressure, for example. For this purpose it is possible for example to use single-screw extruders or twin-screw extruders, which distil off the solvent in the same vacuum stage or in different vacuum stages, and which posses, where appropriate, a feed preheater.

After the blending operation, the respective adhesive is applied to the 2D element. This application itself takes place by means of typical equipment, such as via a melt die or an extrusion die. With this application the 2D element is coated on one side in each case with the respective adhesive. A sheetlike adhesive coating obtained in this way from the applied adhesive may cover the 2D element over its whole area on one side or else may only be applied locally.

The adhesives can be applied directly to the 2D element—for instance, to a carrier or to another, flat-spread adhesive layer. Instead, application may also take place indirectly, using for instance an in-process liner as a temporary carrier, or using a release agent.

In-process liners which can be used are all of the in-process liners that are known to the skilled person, such as release sheets and release varnishes. Release sheets are, for example, sheets of reduced adhesion that are based on polyethylene, polypropylene, polyethylene terephthalate, polyethylene naphthalate, polyimide or are mixtures of these materials. Release varnishes are frequently silicone varnishes or fluorinated varnishes for reducing adhesion.

Release agents which can be used are all of the suitable release agents that are known to the skilled person, such as release papers or release sheets. Typical release papers are those based for instance on polyethylene produced in high-pressure processes (LDPE), polyethylene produced in low-pressure processes (HDPE), or glassine. Typical release sheets are those, for instance, based on films of polyethylene, polypropylene, polyethylene terephthalate, polyethylene naphthalate, polyimide or mixtures of these materials. For a further reduction in adhesion, the release agents may additionally have been furnished with a release layer. Materials suitable for a release layer are all typical materials known to the skilled person, such as silicone release varnishes or fluorinated release varnishes.

To produce a 2D element in a direct process it is possible for example in a first step to apply one of the two adhesives to one side of a carrier and in a second step to apply the other of the two adhesives to the other side of the carrier. Alternatively, in a direct coating, one adhesive can be applied in a first step to a release agent, and the other adhesive in a second coating step, from solution or from the melt, directly to the one adhesive, namely to the side of the one adhesive that is not covered by the release agent. In this latter way a carrier-free 2D element is obtained, an adhesive transfer tape for example.

In the case of an indirect application, both adhesives are first applied separately from one another to an in-process liner or release agent and are joined to one another only in a subsequent step. In order to achieve particularly efficient adhesion of the two adhesives to one another, in the last step it is possible to laminate two adhesive coatings, applied to temporary carriers, directly to one another in a hot lamination process under pressure and temperature, such as by means of a hot roll laminator. The product can then be processed further as a double-liner product. Alternatively one of the two in-process liners can be delaminated again.

It is of course also possible for the two adhesives to be joined directly to one another or to a common carrier in a joint process step, such as in a coextrusion.

Depending on the specific application, the average thickness of the first adhesive coating comprising the first adhesive and/or of the second adhesive coating comprising the second adhesive may be chosen as desired; typical in each case is an average thickness in a range from 5 μm to 500 μm, in particular in a range from 15 μm to 300 μm. To ensure optimum coating thickness, the 2D element with the adhesive may additionally be stretched. The first adhesive coating and the second adhesive coating may be identical in terms of their average thickness or else may differ.

A heat-activatedly bondable 2D element of this kind is suitable for the stable joining of objects with a metal surface to objects with a plastic surface. An adhesive bond is obtained which is mechanically robust at different temperatures, if the first adhesive is bonded to the metal surface and the second adhesive to the plastic surface. Metals used are all typical metals, particularly steel, including stainless steel, noble metal, chromium-plated copper or nickel, aluminium, and also metallized plastic parts. Plastics used are all typical plastics, such as polyvinyl chloride, acrylonitrile-butadiene-styrene copolymers or polycarbonate, and also mixtures based on these plastics.

The 2D element is particularly favourable for the adhesive bonding of decorative elements to electronic devices. Decorative elements are regarded as encompassing all elements which are intended to design or codetermine the external appearance of an article deliberately and in a desired way; this does not rule out an additional functional definition of the decorative elements, for example as a handling means or as a shield against electromagnetic radiation. Electronic devices are all kinds of such devices, including those from industry, and devices of the entertainment industry. In respect of the latter, attention may be drawn, for instance, to mobile consumer electronics articles, for the purpose of data recording, data processing, data reproduction or telecommunication.

Not only decorative elements but also electronic devices may in this context be present in a made-up form with heat-activatedly bondable 2D elements, with one adhesive of the 2D element being joined to the first joining body—the decorative element or the electronic device—and being able to be stored in this way up until the time of adhesive bonding with the corresponding counterpiece as the second joining body. The other adhesive, that intended for bonding to the second joining body, on the semi-bonded 2D element, may for storage purposes be lined with a temporary carrier. The join with the first joining body may be provisional or permanent. In the case of a provisional join, both adhesives are activated at the same time, namely not until the other adhesive has been brought into contact with the second joining body. In the case of a permanent join, the temperature needed to activate the one adhesive is advantageously lower than the temperature for activating the other adhesive. Consequently the activation of one adhesive is not yet accompanied by activation of the other adhesive. Thus the other adhesive can still be activated after joining to the second joining body, in a second step. Activation takes place thermally for a defined activation time and usually with the join under a pressure load.

BRIEF DESCRIPTION OF THE DRAWINGS

Further advantages and application possibilities are apparent from the investigations into some clearly illustrative exemplary embodiments, which will be described below in more detail with reference to the attached drawings, in which FIG. 1 shows a diagrammatic representation of the experimental set-up for investigating the impact strength of an adhesive bond obtained with the 2D element of the invention;

FIG. 2 shows a diagrammatic representation of the experimental set-up for investigating the bond strength of an adhesive bond obtained with the 2D element of the invention;

Investigations into the impact strength of a bond between a metallic test article and a plastic test article were carried out at different test-article temperatures with the set up depicted in FIG. 1. The metallic test article used was an aluminium plate 1 having a length of 100 mm, a width of 20 mm and a thickness of 1.5 mm. The plastic test article used was a polycarbonate plate 2 having a length of 100 mm, a width of 20 mm and a thickness of 3.0 mm.

Figure 3:
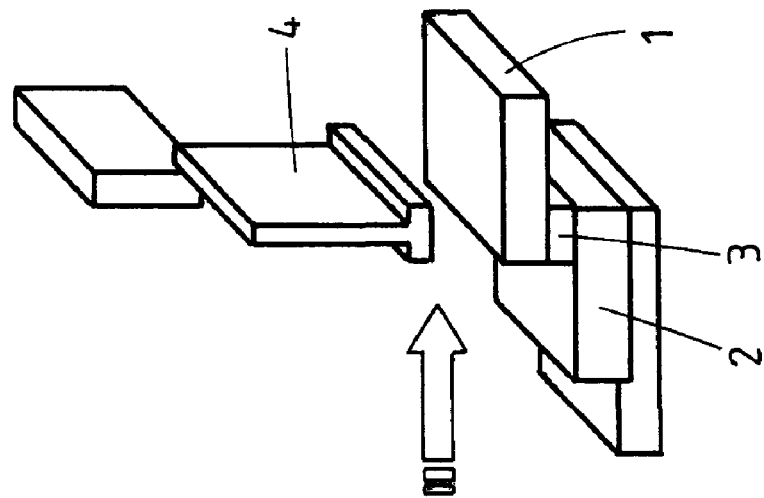
FIG. 3 shows a diagrammatic representation of an exemplary embodiment of a bond of the 2D element of the invention by means of a heating press.
Figure 3:
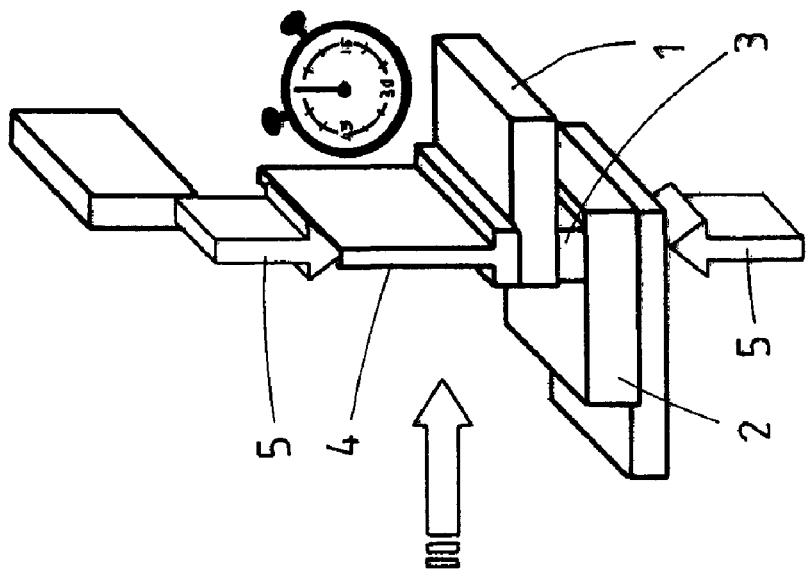
Figure 3:
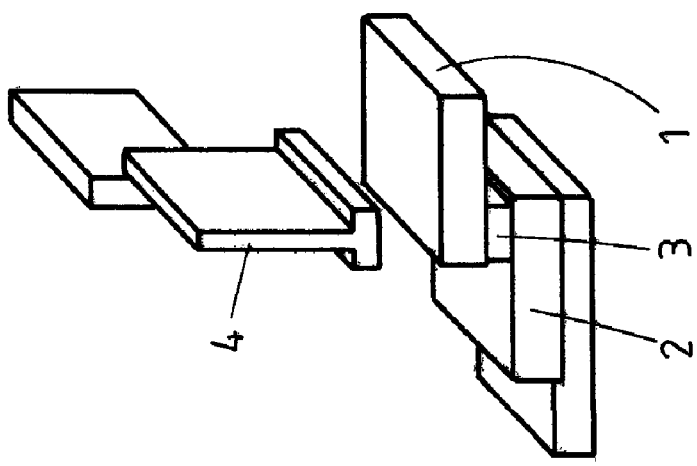

In preparation for the measurement, the two plates were bonded to one another with a 10 mm overlap at their narrow sides by means of a heat-activatedly bondable 2D element 3, forming a bond area of 200 mm². For this purpose the heat-activatedly bondable 2D element 3, with a total thickness of 200 µm, was laminated, in a first step, by the side adapted for bonding to metal surfaces (in the case of the present exemplary embodiments, the first adhesive) and by means of a hotplate heated at 95° C., to the aluminium plate. Subsequently the release sheet was peeled from the other adhesive and bonding took place by the side adapted for bonding with plastic surfaces (in the case of the present exemplary embodiments, the second adhesive) to the polycarbonate plate. The ultimate bonding of the test articles was carried out in a heating press, the bond site being heated from the aluminium side. Heat activation was carried out with a heating-press ram at 180° C. with a pressure of 5 bar and a pressing time of 5 s (for implementation cf. FIG. 3: aluminium plate 1; polycarbonate plate 2; heat-activatedly bondable 2D element 3; heating-press ram 4; direction of pressure 5; sequence from left to right).

The test assembly was in each case heated or cooled to a desired measurement temperature immediately after compression and heat activation, and was equilibrated at that temperature for approximately 30 minutes. Immediately prior to the measurement, a weight with a mass of 50 g was fastened to the polycarbonate plate. The impact strength was determined by investigating the consequences of impingement of the assembly as a whole onto a steel plate 5 after a fall from different heights (arrows in FIG. 1 correspond to the direction of falling). The parameter determined in each case here was the maximum height at which the bond comprising the heat-activatedly bondable 2D element still absorbed the impact energy, without the assembly of the two test articles becoming detached. The respective data value for the maximum height of fall at this temperature resulted as the average value from three individual measurements in each case.

The stability and bond strength of an adhesive bond between a metallic test article and a plastic test article were determined at different test-article temperatures in a dynamic shear test using the set up depicted in FIG. 2. The metallic test article used was an aluminium plate 1 having a length of 100 mm, a width of 20 mm and a thickness of 1.5 mm. The plastic test article used was a polycarbonate plate 2 having a length of 100 mm, a width of 20 mm and a thickness of 3.0 mm.

In preparation for the measurement, the two plates were bonded to one another with a 10 mm overlap at their narrow sides by means of a heat-activatedly bondable 2D element 3, forming a bond area of 200 mm². For this purpose the heat-activatedly bondable 2D element 3, with a total thickness of 200 µm was laminated, in a first step, by the side adapted for bonding to metal surfaces (in the case of the present exemplary embodiments, the first adhesive) and by means of a hotplate heated at 95° C., to the aluminium plate. Subsequently the release sheet was peeled from the other adhesive and bonding took place by the side adapted for bonding with plastic surfaces (in the case of the present exemplary embodiments, the second adhesive) to the polycarbonate plate. The ultimate bonding of the test articles was carried out in a heating press, the bond site being heated from the aluminium side. Heat activation was carried out with a heating-press ram at 180° C. with a pressure of 5 bar and a pressing time of 5 s (for implementation cf. FIG. 3: aluminium plate 1; polycarbonate plate 2; heat-activatedly bondable 2D element 3; heating-press ram 4; direction of pressure 5; sequence from left to right).

The test assembly was in each case heated or cooled to a desired measurement temperature immediately after compression and heat activation, and was equilibrated at that temperature for approximately 30 minutes. Subsequently the unbonded end section of each test article was fixed in the holder of a tensile load testing apparatus (Zwick GmbH & Co. KG) and the two test articles were pulled apart (arrows F in FIG. 1 correspond to the directions of pulling) at a rate of advance of 10 mm/min. The result obtained was the maximum force per unit area (in N/mm²) necessary in order to part the adhesive bond and to separate the test articles from one another. Measurements were carried out at different temperatures and humidities (at −20° C./0% relative humidity, at 23° C./50% relative humidity and at 50° C./50% relative humidity). The respective data value for the maximum tensile load at this temperature resulted as the average value from three individual measurements in each case.

Figure 4:
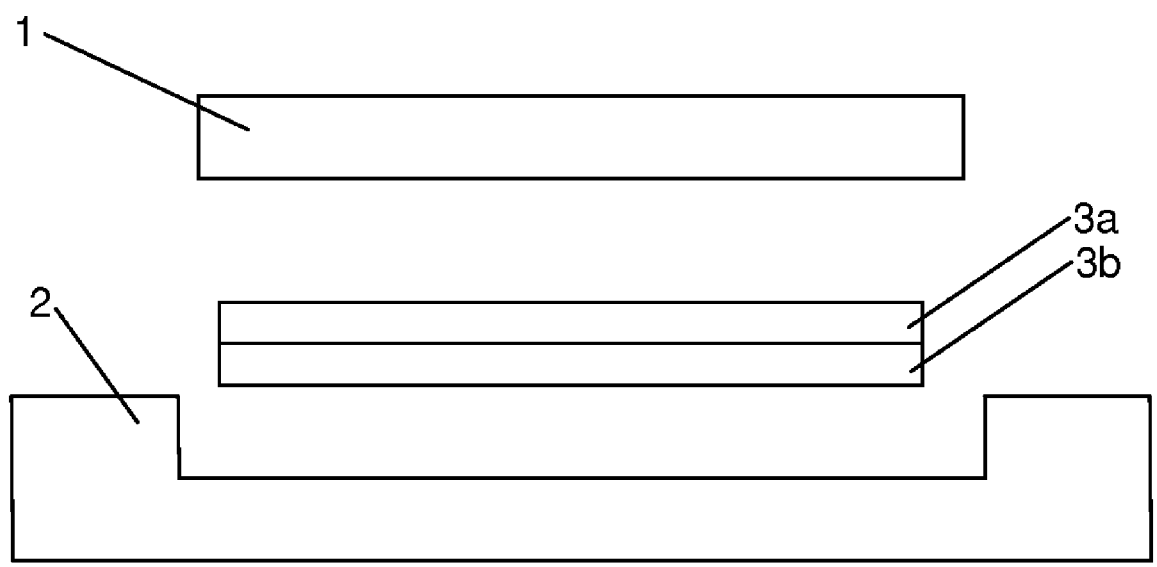
FIG. 4 shows the diagrammatic representation of a bond made using the 2D element of the invention between a plastic substrate and a metal substrate in an art test relating to the torsional strength.

As a further measure of the stability of an adhesive bond between a metallic test article and a plastic test article, the torsional strength of this bond at low temperatures was investigated qualitatively in an art test reproduced diagrammatically in FIG. 4. For this purpose a heat-activatedly bondable 2D element 3a, 3b (with the adhesive coating 3a adapted for bonding to the metal surface and with the adhesive coating 3b adapted for bonding to the plastic surface) with a total thickness of 200 µm was used to bond a decorative element 1 made of aluminium (a mobile-phone "shell") to the polycarbonate casing 2 of a mobile phone. The bond area was approximately 400 mm². Heat activation was carried out in a heating press with a heating-press ram at a temperature of 180° C. under a pressure of 5 bar and with a pressing time of 5 seconds. After 24 hours the assembly was cooled to −20° C. For the investigation, one of the two end sections of the mobile phone was clamped in firmly and the other end section was twisted relative to the first end section. A pass was obtained in the torsional test if the adhesive bond between decorative element 1 and mobile phone 2 did not come apart in the course of twisting.

To produce samples of the heat-activatedly bondable 2D elements ("examples") and also samples for conventional heat-activatedly bondable 2D elements ("reference examples"), four adhesives were prepared, referred to below as adhesive A, adhesive B, adhesive C and adhesive D.

For this purpose the nitrile rubber components of each adhesive were introduced together with a phenol novolak resin and a phenolic resole resin as a 30% strength solution in methyl ethyl ketone into a kneader and the whole was mixed over the course of 20 hours. Besides 50% by weight of the respective nitrile rubbers, the adhesives contained 40% by weight of Durez 33040 (blended with 8% by weight HMTA; Rohm and Haas) as phenol novolak resin and 10% by weight 9610 LW (Bakelite) as phenolic resole resin.

The compositions of the adhesives were as follows:

Adhesive A (used as an example of a first adhesive) contained 50% by weight of Breon N36 C80 (Zeon) as nitrile rubber.

Adhesive B (used as a further example of a first adhesive) contained 50% by weight of Nipol N1094-80 (Zeon) as a nitrile rubber.

Adhesive C (used as an example of a second adhesive) contained 17% by weight Nipol 40-5 (Zeon), 17% by weight Breon N33C50 (Zeon) and 16% by weight Nipol 1034-60 (Zeon) as a nitrile rubber blend.

Adhesive D (used as a further example of a second adhesive) contained 10% by weight Nipol 40-5 (Zeon), 15% by weight Breon N33C50 (Zeon), 30% by weight Nipol 1034-60 (Zeon) as a nitrile rubber blend. Additionally adhesive D contained a further 5% by weight of the phenol novolak resin, in other words a total of 45% by weight of Durez 33040 (blended with 8% by weight HMTA; Rohm and Haas).

After mixing, the resulting heat-activatedly bonding adhesive was coated from solution onto a glassine release paper and dried at 100° C. for 10 minutes. After drying, the coat thickness was 100 µm.

To produce the samples for the examples, two in each case of the adhesives A, B, C and D coated onto the release papers were selected and were joined to one another on the sides not lined with release papers, so giving in each case carrier-free, two-sidedly bondable 2D elements. For this purpose the adhesives coated onto the release papers were laminated together using a hot roll laminator at an operating temperature of 140° C. with an applied pressure of 3 bar. The total thickness of the two-sidedly bondable 2D elements thus produced was 200 µm after lamination.

For Example 1, polymer A and polymer C were laminated together.

For Example 2, polymer A and polymer D were laminated together.

For Example 3, polymer B and polymer C were laminated together.

For Example 4, polymer B and polymer D were laminated together.

For Reference Example 5 a commercial thermoplastic copolyester on a carrier with a layer thickness totalling 150 µm was used (3M 615S™ from 3M).

For Reference Example 6 a commercial thermoplastic copolyamide with a layer thickness of 40 µm (Tesa™ 8440 from tesa AG) and polymer A with a thickness of 100 µm were laminated together on a hot roll laminator to an operating temperature of 140° C. with an applied pressure of 3 bar.

As Reference Example 7, polymer A in the form of a single layer, with a layer thickness of 100 µm, was used.

As Reference Example 8, polymer B in the form of a single layer, with a layer thickness of 100 µm, was used.

The results of the investigations into impact strength of the adhesive bond are summarized in Table 1. The values reproduced are, for different samples, the maximum heights of fall (in cm), determined at room temperature and at −20° C., for which the adhesive bond of the test articles was not broken as a result of the impact. Where the adhesive bond remained intact even at the highest height of fall investigated, the datum is to be interpreted as "greater than the highest height of fall investigated".

For the reference examples there was investigation, furthermore, of the site at which the join had broken in the event of parting of the adhesive bond. Where the parting occurred between the two adhesives, the measurement value has been given an asterisk; where the parting took place between the adhesive and plastic surface, this is shown with two asterisks after the measurement value.

TABLE 1

|  | Maximum height of fall [cm] Measurement temperature | |
| --- | --- | --- |
|  | 23° C. | −20° C. |
| Example 1 | >150 | 120 |
| Example 2 | >150 | 110 |
| Example 3 | >200 | 100 |
| Example 4 | >200 | 110 |
| Reference Example 5 | 60 | 5 |
| Reference Example 6 | 60 | 5* |
| Reference Example 7 | >150 | 8** |
| Reference Example 8 | >150 | 15** |

From Table 1 it is apparent that bonds of samples of Inventive Examples 1 to 4 withstand falling of the test articles from higher heights, both at 23° C. and at −20° C., intact, than the corresponding reference examples, which suggests a significantly higher impact strength of adhesive bonds with the inventive 2D elements. This effect was considerable in particular in the case of the measurements carried out at low temperatures.

As can be seen in the case of Reference Example 6, using two different adhesives which are laminated to one another, a break in join under impact loading frequently occurs at the boundary between the two adhesives.

From Reference Example 7 and Reference Example 8 it is apparent that in those cases, under an impact load, a break in join regularly occurs at the boundary between the adhesive and the plastic substrate. This can be attributed to an absence of compatibility, in other words to an inadequate adaptation of the adhesives to the specific bonding conditions required, said incompatibility affecting in particular the robustness in the low-temperature range.

The results of the investigations into the bond strength are summarized in Table 2. The parameters reproduced are the maximum shearing forces (in N/mm$^2$), determined at room temperature, at +50° C. and at −20° C. for different specimens, and related to the size of the bond area, for which the adhesive bond between the test articles was still not parted.

For the reference examples there was an investigation, additionally, into the location at which the join broke in the event of parting of the bond. Where this parting took place between the two adhesives, the measurement value has been given an asterisk.

TABLE 2

|  | Maximum shearing force per unit area [N/mm$^2$] Measurement temperature | | |
| --- | --- | --- | --- |
|  | +23° C. | +50° C. | −20° C. |
| Example 1 | 5.3 | 1.5 | 6.2 |
| Example 2 | 4.9 | 1.6 | 7.1 |
| Example 3 | 5.4 | 1.8 | 7.0 |
| Example 4 | 4.7 | 1.4 | 7.5 |
| Reference Example 5 | 4.0 | 0.6 | 5.3 |
| Reference Example 6 | 2.0* | 0.3* | 0.3* |

TABLE 2-continued

|  | Maximum shearing force per unit area [N/mm²] Measurement temperature | | |
| --- | --- | --- | --- |
|  | +23° C. | +50° C. | −20° C. |
| Reference Example 7 | 4.3 | 1.5 | 4.8 |
| Reference Example 8 | 3.9 | 1.0 | 5.5 |

From Table 2 it is evident that the adhesive bonds with specimens of the Inventive Examples 1 to 4 withstood a higher maximum shearing force at +23° C., at +50° C. and at −20° C. than those with specimens of the reference examples, and hence also permitted higher bond strengths.

At +23° C. the difference between the inventive examples and the reference examples is marked. The large difference between the inventive 2D elements and Reference Examples 7 and 8 shows that the already good bond strength of the adhesive could be increased still further solely by using a two-layer construction of the 2D element with two adhesives.

At low temperatures the difference between the inventive and reference examples is likewise clear and is manifested with particular clarity in the case of Reference Example 6: while an adhesive bond with the 2D element from Reference Example 6 showed only a very low stability, all of the inventive adhesive bonds exhibited bond strengths which were in fact higher than those at room temperature. In conjunction with the outstanding insensitivity to impact, this illustrates the fact that the inventive examples do in fact possess an outstanding adhesion behaviour even at low temperatures.

At a measurement temperature of +50° C., the bond strength in the case of the inventive examples and in the case of the reference examples was much lower in each case than the corresponding values at lower temperatures. This can be explained by the decrease in viscosity when the temperature is raised and can be expected in principle for all adhesives. Here, however, it is also apparent that bonds with the inventive examples exhibited higher strengths overall and the corresponding adhesive bonds with the reference examples.

As can be seen from Reference Example 6, when using two different adhesives laminated to one another, there is a break in join, under shearing load as well, frequently at the interface between the two adhesives.

As part of a qualitative investigation oriented to the art, furthermore, an investigation was carried out into the torsion strength of aluminium mobile phone casing shells which had been fastened using heat-activatedly bondable 2D elements to polycarbonate mobile phone casings. When using the Inventive Examples 1 to 4 it was possible to twist the housing shells even at temperatures of −20° C. with respect to the mobile phone casings, without any observation of parting of the join. When Reference Examples 5 and 6 were used, in contrast, the housing shells underwent detachment from the body of the mobile phone at these temperatures.

We claim:

1. Heat-activatedly adhesively bondable substantially two-dimensional element, having a layer of a first adhesive and a layer of a second adhesive, wherein the first adhesive comprises at least a first synthetic nitrile rubber and at least one reactive resin which is capable of crosslinking with itself, with other reactive resins and/or with the at least first synthetic nitrile rubber of the first adhesive, the first synthetic nitrile rubber having an acrylonitrile fraction of more than 20% by weight and less than 50% by weight, based on the total mass of the nitrile rubbers in the first adhesive, the second adhesive comprises a blend of at least second, third and fourth synthetic nitrile rubbers, and at least one reactive resin which is capable of crosslinking with itself, with other reactive resins and/or with at least one of the synthetic nitrile rubbers of the second adhesive, a) the blend being microphase-separated, and having at least three different glass transition temperatures in a differential scanning calorimetry thermogram, b) said at least three glass transition temperatures including an upper glass transition temperature of more than +10° C., a middle glass transition temperature and a lower glass transition temperature of less than −20° C., c) the second nitrile rubber having an acrylonitrile fraction of 35% by weight or more, based on the total mass of the nitrile rubbers in the second adhesive, d) the third nitrile rubber having an acrylonitrile fraction of more than 25% by weight and less than 35% by weight, based on the total mass of the nitrile rubbers in the second adhesive, and e) the fourth nitrile rubber having an acrylonitrile fraction of 25% by weight or less, based on the total mass of the nitrile rubbers in the second adhesive.

2. The substantially two-dimensional element according to claim 1, wherein part of the surface of the layer of first adhesive is in contact with part of the surface of the layer of second adhesive.

3. The substantially two-dimensional element according to claim 1, wherein said substantially two-dimensional element of carrier-free design.

4. The substantially two-dimensional element according to claim 1, wherein said substantially two-dimensional element comprises a porous carrier.

5. The substantially two-dimensional element according to claim 1, wherein, the average thickness of the layer of first adhesive and/or the average thickness of the layer of second adhesive range from 5 μm to 500 μm.

6. The substantially two-dimensional element according to claim 1, wherein, the second nitrile rubber of the second adhesive has a glass transition temperature as determined in a differential scanning calorimetry thermogram of −20° C. or higher.

7. The substantially two-dimensional element according to claim 1, wherein, the second nitrile rubber in the second adhesive has an acrylonitrile fraction of less than 60% by weight, based on the total mass of the nitrile rubbers in the second adhesive.

8. The substantially two-dimensional element according to claim 1, wherein, the mass fraction of the second nitrile rubber is between 5% and 50% by weight, based on the total mass of the nitrile rubbers in the second adhesive, the mass fraction of the third nitrile rubber is between 10% and 90% by weight, based on the total mass of the nitrile rubbers in the second adhesive, and the mass fraction of the fourth nitrile rubber is between 5% and 50% by weight, based on the total mass of the nitrile rubbers in the second adhesive.

9. The substantially two-dimensional element according to claim 1, wherein the blend of the second adhesive has a middle glass transition temperature which represents a broadly distributed glass transition temperature range.

10. The substantially two-dimensional element according to claim 1, wherein said reactive resins are selected from the group consisting of epoxy resins, novolak resins, melamine resins, phenolic resins, terpene phenolic resins and polyisocyanate-based resins.

11. The substantially two-dimensional element according to claim 1, wherein the reactive resins in the first adhesive and/or in the second adhesive are present at a mass fraction of at least 25% and not more than 75% by weight, based in each case on the total mass of the mixture of the nitrile rubbers and the reactive resins in the respective adhesive.

12. The substantially two-dimensional element according to claim 2, wherein the first adhesive and/or the second adhesive comprise bond strength enhancer resins at a mass fraction of not more than 30% by weight, based on the total mass of the respective adhesive.

13. A method for bonding an object having a metal surface to an object having a plastic surface, which comprises bonding said objects with the substantially two-dimensional element of claim 1, the first adhesive being bonded to the metal surface and the second adhesive to the plastic surface.

14. A method for bonding decorative elements to electronic devices which comprises bonding said decorative elements to said electronic devices with the substantially two-dimensional element of claim 1.

15. Decorative element having at least one substantially two-dimensional element of claim 1.

16. Electronic device having at least one substantially two-dimensional element of claim 1.

17. The substantially two-dimensional element of claim 5, wherein said thicknesses ranges from 5 μm to 300 μm.

18. The substantially two-dimensional of claim 6, wherein the second nitrile rubber of the second adhesive has a glass transition temperature as determined in a differential scanning calorimetry thermogram of more than −15° C.

* * * * *